July 21, 1925.
E. A. SOHL
BUMPER
Filed July 19, 1924
1,546,948
2 Sheets-Sheet 1
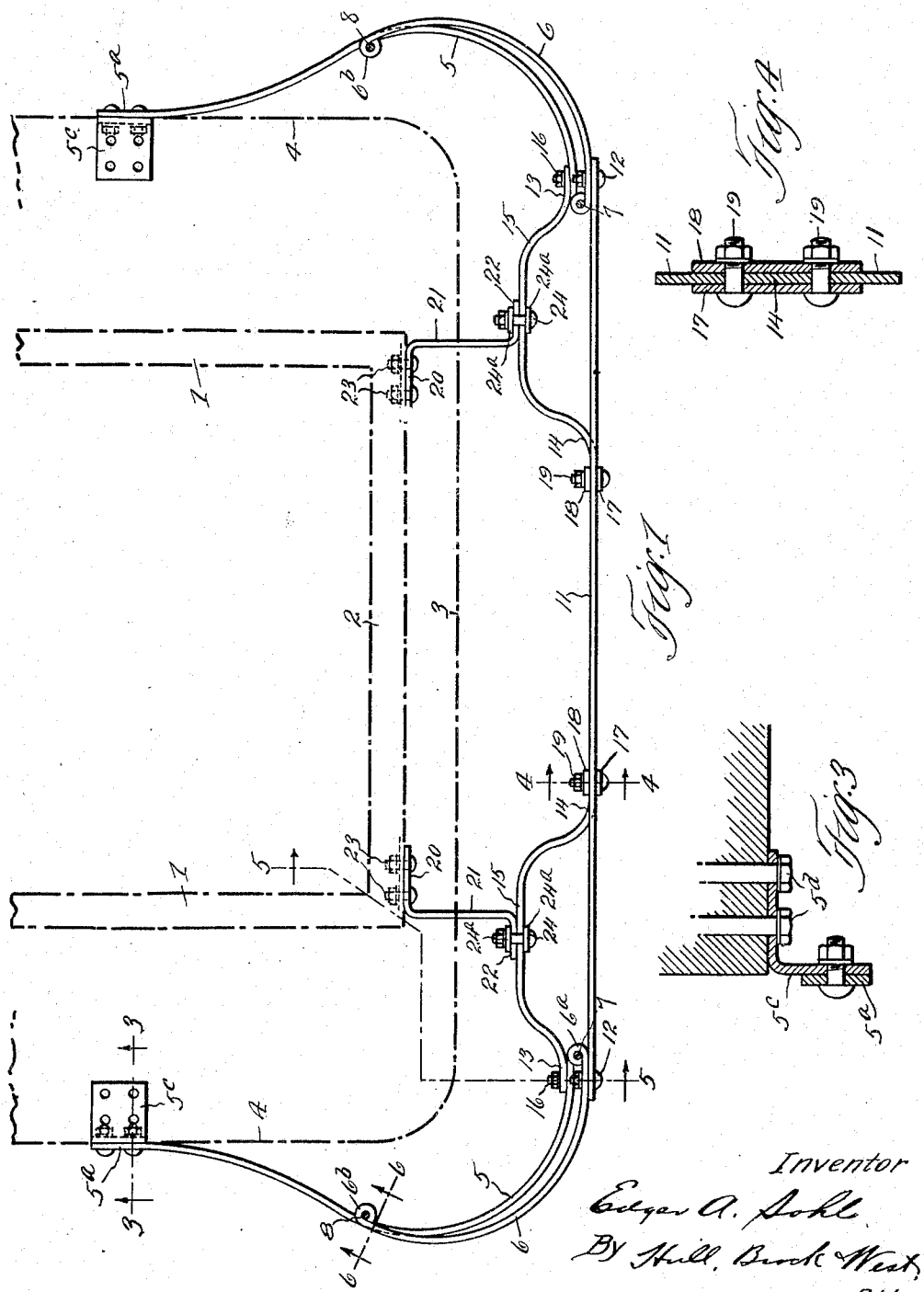

July 21, 1925. 1,546,948
E. A. SOHL
BUMPER
Filed July 19, 1924    2 Sheets-Sheet 2
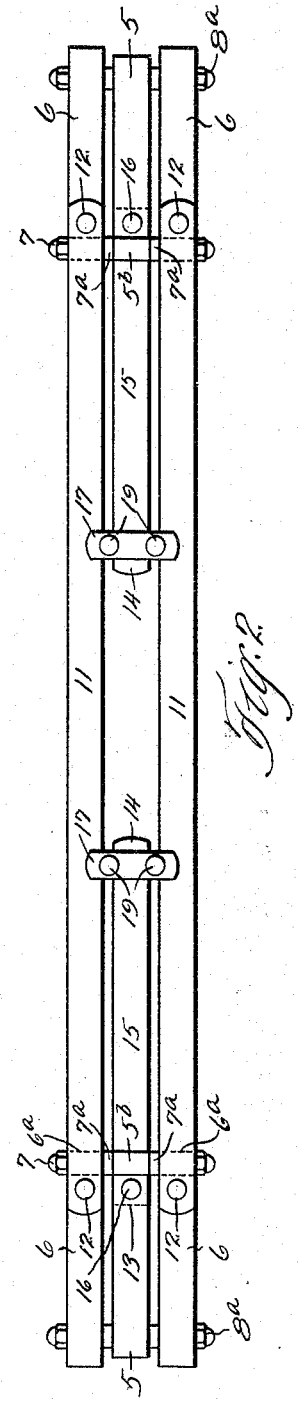
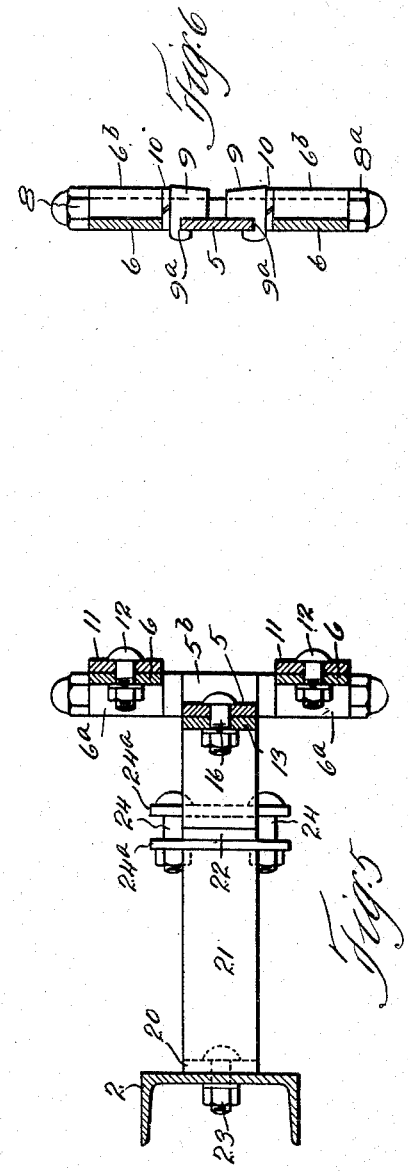
Inventor
Edgar A. Sohl
By Hull, Buck & West
Attys.

Patented July 21, 1925.

1,546,948

UNITED STATES PATENT OFFICE.

EDGAR A. SOHL, OF CLEVELAND, OHIO, ASSIGNOR TO THE C. G. SPRING & BUMPER COMPANY, OF DETROIT, MICHIGAN, A CORPORATION OF DELAWARE.

BUMPER.

Application filed July 19, 1924. Serial No. 726,955.

*To all whom it may concern:*

Be it known that I, EDGAR A. SOHL, a citizen of the United States, residing at Cleveland, in the county of Cuyahoga and State of Ohio, have invented a certain new and useful Improvement in Bumpers, of which the following is a full, clear, and exact description, reference being had to the accompanying drawings.

This invention relates to bumpers for automobiles and, in the particular embodiment disclosed herein, is especially adapted for a combined rear-bumper and corner-guard construction for use with omnibuses.

It is the general purpose and object of the invention to provide a bumper of this character which is particularly efficient for the purpose for which it is designed. Further and more limited objects of the invention are to provide a combined corner-guard and bumper construction which is easily adaptable to bodies of varying widths; also to provide a bumper of this class by which the impacts will be absorbed by and dissipated throughout the bumper- and corner-guard construction. Further and still more limited objects of the invention will be set forth hereinafter and will be realized in and through the construction shown in the drawings, wherein Fig. 1 represents a plan view of a bumper constructed in accordance with my invention, the cooperating parts of the vehicle being shown in dot-and-dash lines and certain bolts being shown in section; Fig. 2 a rear elevation of the bumper; and Figs. 3, 4, 5 and 6 are views corresponding, respectively, to the lines 3—3, 4—4, 5—5 and 6—6 of Fig. 1.

Describing the various parts by reference characters, 1 represents the rear ends of the side members and 2 the rear cross member of a vehicle frame, 3 the rear end and 4 the rear end of the side of the body which is carried by the said frame.

The complete bumper comprises a pair of curved resilient attaching bars secured at their front or inner ends to the sides of the body, a pair of curved corner guard members secured to each of the attaching bars, an impact section comprising impact bars connected to the corner-guard members, and rearwardly or inwardly extending cushion bars connected to the impact bars and to the inner ends of the attaching members and interposed between the sides of the bumper and the vehicle.

The two attaching bars are indicated generally at 5 and each has a front or inner end 5ª which is bolted or otherwise secured to an angle iron clip 5ᶜ, one flange of which is bolted beneath the bottom of the body, as indicated at 5ᵈ. The attaching members are each curved laterally and rearwardly (or outwardly) and inwardly, to provide a resilient protection for their respective corners of the vehicle as well as a support for the additional corner guard members. The rear or outer end of each attaching bar is provided with an eye 5ᵇ (see Figs. 2 and 5). This eye is interposed between eyes 6ª on the rear or outer ends of resilient corner-guard bars or members 6, there being a pair of vertically spaced corner guard members at each end of the bumper construction. Aligned eyes 6ª and 5ᵇ are connected by means of bolts 7, there being washers 7ª interposed between the vertically aligned eyes at each end of the bumper. The corner guard members are curved outwardly and forwardly from their respective eyes 6ª and project beyond the corresponding curved corners of the attaching bars 5, the rear ends of the bars 6 crossing the adjacent portions of their corresponding bars 5 and each being provided at such front end with an eye 6ᵇ, the aligned upper and lower eyes 6ᵇ at each end of the bumper structure being connected by a bolt 8. Each bolt is provided with a pair of sleeves 9 thereon, each sleeve having a seat 9ª therein adapted to receive the upper and the lower edge, respectively, of the adjacent bar 5, there being spacing washers 10 interposed between each eye 6ᵇ and the sleeve 9 adjacent thereto which spacing washers are adapted to be engaged by the bars 6. By setting up the nuts 8ª on the bolts 8, the eyes 6ᵇ are forced toward each other, thereby forcing the clamping sleeves 9 toward each other and firmly securing the front ends of the corner guard bars to the attaching bars 5.

11 denotes an upper and a lower impact bar, which bars extend across the space between the ends of the bars 5 and 6, being secured to the latter bars by means of bolts 12.

For the purpose of securing the bumper structure to the vehicle frame, it is preferred to use a pair of cushion bars, one at each side of the central portion of the bumper structure and each having its ends fastened to the bumper structure with a forwardly (or inwardly) bowed central portion which may provide means for attaching supporting arms thereto. Each cushion bar comprises an outer end 13, an inner end 14, and a forwardly or inwardly bowed or projecting central portion 15, the construction providing a flattened U-shaped projection to which an attaching arm may be conveniently secured. The end portion 13 of each cushion bar is secured, as by means of a bolt 16, to the adjacent attaching bar 5, while the inner end 14 of each cushion bar extends between the impact bars 11 and is secured to such impact bars by rear and front plates 17 and 18 having their ends engaging opposite faces of the bars 11, with bolts 19 connecting the said plates between the upper and lower edges of the ends 14 and the lower and upper edges of the bars 11—see Fig. 4.

The arms which secure the body portions of the bumper to the vehicle frame are shown as of approximately Z-form, comprising each a flattened or flanged front end 20, a rearwardly or outwardly extending intermediate portion 21, and a rear or outer flange 22, which is adapted to bear against the extended central portion 15 of the corresponding cushion bar. The flanges 20 are shown as secured to the rear frame member 2 by means of bolts 23, while the flanges 22 are shown as secured to the central portions of their respective cushion bars by bolts 24.

In certain installations, it may be desirable to omit the arms 21. In this event, should the impact portion of the bumper be deflected forwardly or inwardly a sufficient distance, the projecting portions 15 of the cushion bars will engage the vehicle body or frame and thereby exercise their cushioning effect, after such deflection. Where the attaching arms 20 and 22 are employed, the cushioning effect will occur immediately upon the delivery of a blow to the rear or impact portion of the bumper.

It will be noted that the corner-guard bars 6 and the attaching bars 5 are so constructed, arranged, and connected that they provide jointly a triple curved guard for each corner of a vehicle, while the attaching bars also constitute the means for supporting the corner-guard bars. Also that, where the arms 21 are employed, these arms support the rear or outer ends of the bars 5 and 6 from the vehicle. When such arms are not employed, the cushion bars serve as means for supporting the ends of the aforesaid bars from the vehicle by connecting such ends with the ends of the opposed attaching and corner-guard bars.

Having thus described my invention, what I claim is:—

1. The combination, with a vehicle, of a bumper comprising a pair of attaching bars each secured at its inner end to a side of such vehicle and extending about a corner thereof, a pair of corner-guard bars for each attaching bar and each supported at its inner end by an attaching bar and each also extending about a corner of the vehicle, and a pair of impact bars interposed and supported between the opposed outer ends of the attaching bars and corner-guard bars.

2. The combination, with a vehicle, of a bumper comprising a pair of attaching bars each secured at its inner end to a side of such vehicle and extending about a corner thereof, a pair of corner-guard bars for each attaching bar and arranged respectively above and below the outer portion of each attaching bar and each extending about a corner of such vehicle, means supporting the inner ends of said corner-guard bars, means connecting the outer ends of each pair of corner-guard bars and the outer end of their cooperating attaching bar, and a pair of vertically spaced impact bars extending between the opposed outer ends of the attaching bars and corner-guard bars and operatively connected to such ends.

3. The combination, with a vehicle, of a bumper comprising a pair of attaching bars each secured at its inner end to a side of such vehicle and extending about a corner thereof, a pair of corner-guard bars for each attaching bar and arranged respectively above and below the outer portion of each attaching bar and each extending about a corner of such vehicle, means supporting the inner ends of said corner-guard bars from their respective cooperating attaching bars, means connecting the outer ends of each pair of corner-guard bars and the outer end of their cooperating attaching bar, and a pair of vertically spaced impact bars extending between the opposed outer ends of the attaching bars and corner-guard bars and operatively connected to such ends.

4. The combination, with a vehicle, of a pair of attaching bars each supported at one end by the vehicle and each curved and forming a resilient protection for a corner of the vehicle, a pair of curved members at each side of the vehicle and arranged to protect the corners of the vehicle and having their rear or outer ends connected to the corresponding ends of the attaching bars and their front or inner ends secured to the corresponding attaching bars intermediate the ends of the latter, and a plurality of impact members between the rear or outer ends of the said bars.

5. A bumper comprising, in combination, a pair of vertically spaced corner-guard bars at each side of the bumper structure, an attaching bar at each side of the structure and each having one end adapted to be secured to a vehicle and the other end secured to and between the outer ends of the corresponding corner-guard bars and being also secured at an intermediate portion to and between the inner ends of said corner-guard bars, and a pair of vertically spaced impact members extending between and operatively connected to corresponding ends of the corner-guard bars.

6. A bumper comprising, in combination, a pair of vertically spaced corner-guard bars at each side of the bumper structure, a pair of vertically spaced impact bars secured to said corner guard bars, and attaching bars each secured at one end to and between the outer ends of each pair of corner-guard bars and adapted at its opposite end for attachment to a vehicle frame.

7. The combination, with a vehicle, of a bumper having outwardly bowed ends connected to said vehicle, and cushion bars secured to said bumper, one on each side of the center thereof, and each having a resilient portion projecting toward and spaced from the vehicle.

8. A bumper comprising a pair of vertically spaced impact bars and outwardly and inwardly extending attaching bars connected to and between said impact bars, and a pair of cushion bars each having one end secured to and between the impact bars and its opposite end secured to an attaching bar.

9. A bumper comprising, in combination, a pair of vertically spaced impact bars and vertically spaced corner-guard bars connected to said vertically spaced impact bars, corner attaching bars each having its outer end secured to and between corresponding ends of the corner-guard bars and each having an intermediate portion connected to and between the inner ends of its cooperating corner-guard bars, and a cushion bar at each side of the bumper structure, each cushion bar having one end secured to the outer end of an attaching bar and its opposite end secured to and between the impact bars.

10. The combination, with a vehicle, of a pair of attaching bars each supported at one end by the vehicle and a pair of vertically spaced impact bars extending between the outer ends of said attaching bars and above and below the same and connected thereto, a pair of corner-guard bars at each side of the bumper structure and having their rear or outer ends connected to the corresponding ends of the attaching bars and their front or inner ends secured to the corresponding attaching bars intermediate the ends of the latter, and forwardly projecting cushion bars secured to the bumper structure and located on each side of the center of said structure and between the same and the outer portions of the corner-guard bars.

11. The combination, with a vehicle, of a bumper having outwardly bowed ends connected to said vehicle, cushion bars secured to said bumper, one on each side of the center thereof, and each having a resilient central portion projecting toward the vehicle, and arms connecting such central portions with the vehicle.

12. A bumper comprising an impact section and outwardly bowed resilient attaching members, a pair of cushion bars secured to the impact section, one on each side thereof, and each having a resilient portion projecting toward the vehicle frame or body, and arms connecting such resilient portions of said cushion bars with said vehicle.

13. The combination, with a vehicle, of a pair of attaching bars each supported at one end by the vehicle and a pair of vertically spaced impact bars extending between the outer ends of said attaching bars and above and below the same and connected thereto, a pair of corner-guard members at each side of the bumper structure and having their rear or outer ends connected to the corresponding ends of the attaching bars and their front or inner ends secured to the corresponding attaching bars intermediate the ends of the latter, forwardly projecting cushion bars secured to the bumper structure and located on each side of the center of said structure and between the same and the outer portions of the corner-guard members, and an arm secured to each of said cushion bars and to the vehicle frame.

14. A bumper comprising in combination outwardly and rearwardly extending attaching bars having their front or inner ends adapted for attachment to a vehicle and provided each at its rear or outer end with an eye, an upper and a lower corner-guard bar for each attaching bar and each having an eye at its rear or outer end adapted to align with the eye in the corresponding end of the said attaching bar, bolts extending through such aligned eyes, each corner-guard bar having an eye at its inner end, bolts extending through the aligned eyes of each pair of corner-guard bars, clamps on each bolt adapted to engage the portion of the attaching bar which is interposed between such eyes, and upper and lower impact bars secured to the rear or outer portions of the corner-guard bars.

15. A bumper comprising end members adapted to be attached to opposite sides of a vehicle, an impact section connected to said end members, a pair of cushion members each connected to the bumper on opposite sides of the center thereof and between such center and an end of said bumper, and spacing members for securing said cushion members to said vehicle.

16. A bumper comprising end members adapted to be attached to opposite sides of a vehicle, an impact section connected to such end members, and a cushion member on each side of the center of said bumper and between such center and an end of said bumper, each cushion member having its ends secured to said bumper and an intermediate portion projecting toward the vehicle to which the said bumper is attached.

17. A bumper comprising end members adapted to be attached to opposite sides of a vehicle, an impact section connected to such end members, and a cushion member on each side of the center of said bumper and between such center and an end of said bumper, each cushion member having its ends secured to said bumper and an intermediate portion projecting toward the vehicle to which the said bumper is attached, and a spacing member connected to each of said cushion members for securing the same to such vehicle.

18. A bumper comprising an impact section, and a cushion member connected at its ends to said bumper and having a portion intermediate the ends thereof projecting from said bumper toward the vehicle to which the said bumper may be attached.

19. The combination, with a vehicle, of a pair of attaching bars each supported at one end by the vehicle, a pair of corner-guard members at each side of the bumper structure and having their rear or outer ends connected to the rear or corresponding ends of the cooperating attaching bars and their front or inner ends secured to the corresponding attaching bars, forwardly projecting cushion bars secured to the bumper structure and located on each side of the center of such structure and between the same and the outer portions of the corner-guard members, an arm secured to each of said cushion bars and to the vehicle arm, and a pair of vertically spaced impact bars having their ends connected directly to the corner-guard bars on opposite sides of the bumper structure.

In testimony whereof, I hereunto affix my signature.

EDGAR A. SOHL.